(12) United States Patent
Yang (10) Patent No.: US 7,773,534 B2
(45) Date of Patent: Aug. 10, 2010

(54) COMPUTER COMMUNICATION INTERFACE TRANSMISSION CONTROL CODES ANALYZING METHOD AND SYSTEM

(75) Inventor: Yao-Tsung Yang, Taipei (TW)

(73) Assignee: Inventec Corporation, Taipei (TW)

( * ) Notice: Subject to any disclaimer, the term of this patent is extended or adjusted under 35 U.S.C. 154(b) by 1310 days.

(21) Appl. No.: 11/270,224

(22) Filed: Nov. 8, 2005

(65) Prior Publication Data

US 2006/0149882 A1 Jul. 6, 2006

(30) Foreign Application Priority Data

Dec. 31, 2004 (TW) .............................. 93141700 A
Aug. 16, 2005 (TW) .............................. 94127817 A (51) Int. Cl.
*H04L 12/26* (2006.01)
*H04L 12/28* (2006.01)

(52) U.S. Cl. ....................................... 370/250; 370/419

(58) Field of Classification Search ................. 370/216, 370/241, 250, 251, 389, 392, 395.7, 419
See application file for complete search history.

(56) References Cited

U.S. PATENT DOCUMENTS

| | | | |
|---|---|---|---|
| 5,371,747 A * | 12/1994 | Brooks et al. ................. | 714/38 |
| 5,881,288 A * | 3/1999 | Sumi et al. ................... | 717/125 |
| 6,434,741 B1 * | 8/2002 | Mirani et al. ................ | 717/124 |
| 6,785,884 B1 * | 8/2004 | Rieschl ........................ | 717/129 |
| 2003/0210694 A1 * | 11/2003 | Jayaraman et al. .......... | 370/392 |
| 2007/0044075 A1 * | 2/2007 | Koning et al. ................ | 717/122 |

* cited by examiner

*Primary Examiner*—Hong Cho
(74) *Attorney, Agent, or Firm*—Peter F. Corless; Steven M. Jensen; Edwards Angell Palmer & Dodge LLP (57) ABSTRACT

A computer communication interface transmission control codes analyzing system and method for a computer platform to analyze machine codes received by the computer platform are disclosed. The system includes a header record area having a plurality of header units for storing address information, a code definition record area for storing codes generated when the electronic information device generates the transmission control codes and the transmission control codes are transmitted over the communication interface, and a descriptor analyzing unit for searching the machine codes for data stored in the address information of the header units of the header record area when receiving the machine codes, searching the code definition record area for codes corresponding to the searched data and operating description contents represented by the searched codes, and displaying the searched codes and operating description contents on a display unit electrically connected to the computer platform.

18 Claims, 6 Drawing Sheets

| Address | _command_ED | | TDTailP | TDHeadP | NextED |
|---|---|---|---|---|---|
| 0060 : 000E8100 | 00 | 40 | | F0 87 0E 00 | B0 82 0E 00 |
| 0060 : 000E8110 | FF | 50 _deque | 00 | 00 83 0E 00 | 60 81 0E 00 |
| 0060 : 000E8120 | 82 | 30 _keyboa | 00 | 50 84 0E 00 | 60 81 0E 00 |

_command_ED  
Function Address: 00  
Endpoint Number: 0  
Direction OUT → full-speed  
Speed:  
Skip? ignore TD  
Format: General TD 230  
231

COMPUTER COMMUNICATION INTERFACE TRANSMISSION CONTROL CODES ANALYZING METHOD AND SYSTEM

BACKGROUND OF THE INVENTION

1. Field of the Invention

This invention relates to electronic information analyzing technologies, and more particularly, to a computer communication interface transmission control codes analyzing method and system.

2. Description of Related Art

In general, a conventional computer platform, such as a desktop computer, a notebook, a tablet personal computer (PC), a network workstation, and so on, is equipped with an external communication interface, such as s Universal Serial Bus (USB) communication interface, a Firewire communication interface, and so on. Therefore, the computer platform is capable of exchanging data (performing a data transmission process) via the external communication interface a variety of external electronic information devices, such as a printer, an external hard drive, a flash disk, a digital camera, a keyboard, a mouse, a scanner, and so on. Having a convenient plug-and-play function, the USB communication interface, and the Firewire communication interface as well, is becoming one of the most important external communication interfaces required by the computer platform.

Based on the above reasons, the USB and the Firewire communication interfaces are typically integrated within PCs by computer manufactures. Therefore, there is a need to process the test works of quality control to the USB and Firewire communication interfaces of the PC products during research and producing processes.

With the current test works on the USB communication interface, once an error condition are found, a debugging work of transmission control codes used thereof is carried out by a computer engineer in order to check each descriptor (e.g., endpoint descriptor, transfer descriptor, and so on) of transmission control codes whether the setting value is correct.

Figure 1:
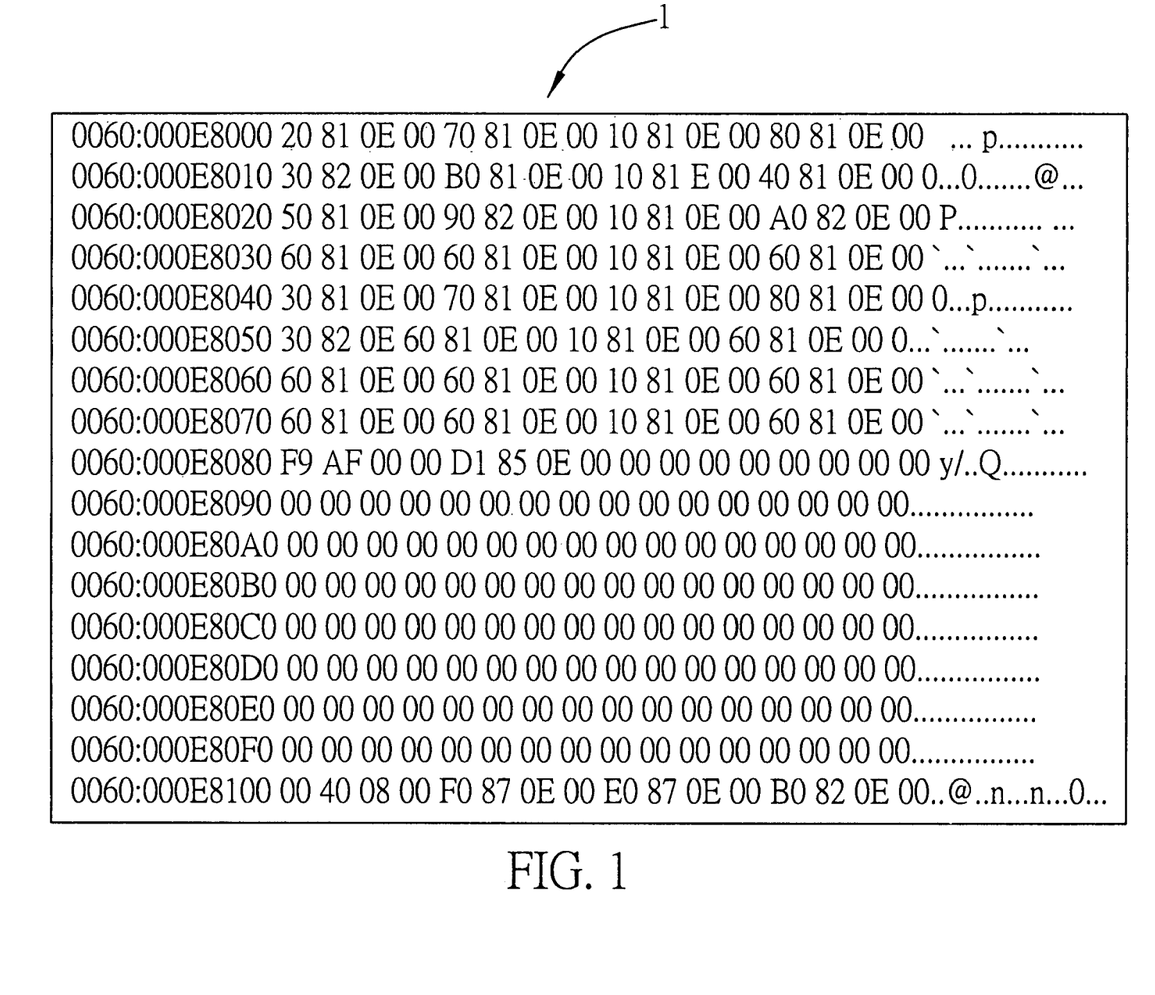
FIG. 1 is an example showing hexadecimal transmission control codes read by a USB communication interface.

However, one drawback of the USB communication interface during debugging is that the embedded transmission control codes are usually represented with machine codes in hexadecimal. An exemplary diagram of the machine codes is shown in FIG. 1. Generally speaking, the machine codes are transmission control codes generated by an electronic information device (such as the forgoing printer, external hard drive, flash disk, digital camera, keyboard, mouse, scanner, and so on), transmitted by a computer communication interface and read by a data reading device (such as tracer). As a result, the machine codes are difficult to understand, resulting the computer engineers need a mapping table to find out the meanings of the transmission control codes, so as to make the debugging work time-wasting and inefficiency.

SUMMARY OF THE INVENTION

In light of the above drawbacks in the prior art, a primary objective of the present invention is to provide a computer communication interface transmission control codes analyzing system and method for analyzing transmission control codes in the USB or Firewire communication interface into a user-friendly and easy-reading table, so as to let computer engineers process the debugging work more efficiently.

In accordance with the above and other objectives, the present invention provides a computer communication interface transmission control codes analyzing method for a computer platform to analyze machine codes received by the computer platform, the machine codes being transmission control codes generated by an electronic information device, transmitted over a computer communication interface and read by a data reading device. The method includes utilizing the computer platform to create a header record area having a plurality of header units for storing address information; utilizing the computer platform to create a code definition record area for storing codes and operating description contents represented by the codes, the codes being generated when the electronic information device generates the transmission control codes and the transmission control codes are transmitted over the communication interface; utilizing the computer platform to search the machine codes for data stored in the address information stored in the header units of the header record area when the computer platform receiving the machine codes; and utilizing the computer platform to search the code definition record area for codes corresponding to the searched data and operating description contents represented by the searched codes, and displaying the searched codes and operating description contents on a display unit electrically connected to the computer platform.

The computer communication interface transmission control codes analyzing system for a computer platform to analyze machine codes received by the computer platform, the machine codes being transmission control codes generated by an electronic information device, transmitted over a computer communication interface and read by a data reading device, includes a header record area having a plurality of header units for storing address information; a code definition record area for storing codes generated when the electronic information device generates the transmission control codes and the transmission control codes are transmitted over the communication interface; and a descriptor analyzing unit for searching the machine codes for data stored in the address information of the header units of the header record area when receiving the machine codes, searching the code definition record area for codes corresponding to the searched data and operating description contents represented by the searched codes, and displaying the searched codes and operating description contents on a display unit electrically connected to the computer platform.

The computer communication interface transmission control codes analyzing method and system of the present invention are characterized in translating the transmission control codes represented in numerical form of the communication interface into a specific symbolic form that is easy to be understood for humans in accordance with a pre-defined corresponding method. The translated symbolic form is collected in a table file in specific form in accordance with a pre-defined table-based method, such as a table file in HTML format. Content of each of descriptors of the transmission control codes is listed in the table-based method, so as to let users understand the content of all of the descriptor easily and find out where the error code more easily during debugging work, and let users (i.e., computer engineers) understand the meaning of the transmission control codes easily and make the debugging work efficiently.

BRIEF DESCRIPTION OF DRAWINGS

The present invention can be more fully understood by reading the following detailed description of the preferred embodiments, with reference made to the accompanying drawings, wherein.

DETAILED DESCRIPTION OF THE PREFERRED EMBODIMENT

The present invention is described in the following with a specific embodiment, so that one skilled in the pertinent art can easily understand other advantages and effects of the present invention from the disclosure of the invention. The present invention may also be implemented and applied according to other embodiments, and the details may be modified based on different views and applications without departing from the spirit of the invention.

Figure 2:
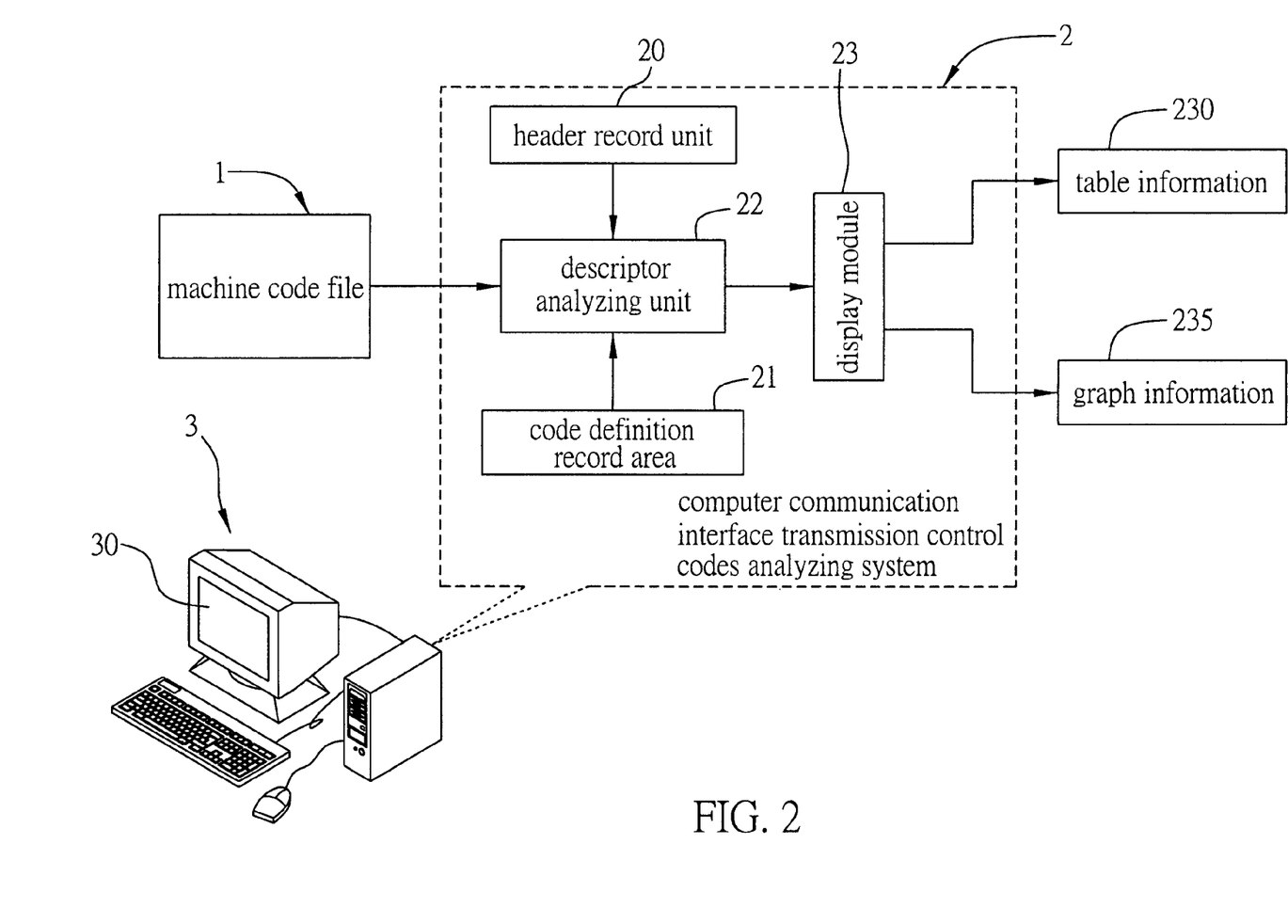
FIG. 2 is a functional block diagram of a computer communication interface transmission control codes analyzing system of the preferred embodiment according to the present invention.

FIG. 2 is a functional block diagram showing a computer communication interface transmission control codes system 2 of the preferred embodiment according to the present invention. As shown in FIG. 2, the computer communication interface transmission control codes analyzing system 2 is installed on a computer platform 3, such as a desktop computer, a notebook, tablet PC, a network workstation, and so on. That is, the computer communication interface transmission control codes analyzing system 2 is for instance a computer software. Transmission control codes (as shown in FIG. 1) read by a data reading device (not shown) can be received by the computer platform 3, and the transmission control codes are machine codes generated by an electronic information device having a computer communication interface (not shown) while performing the data transmission process with an electronic host having a same computer communication interface and read by the data reading device to form a machine code file. It should be noted that forming a machine code file by reading machine codes is a conventional technique, so the detailed description is omitted. The data reading device of the preferred embodiment is, for example, a tracer, and the tracer is able to collect the read transmission control codes into a machine code file in an original form, and the machine code file can be stored in a text-filed form (*.TXT). The electronic information device is, for example, a flash disk, a printer, an external hard disk device, an external compact disk device, a digital camera, and so on (not shown). The communication interface is, for example, the Universal Serial Bus (USB) communication interface or the Firewire communication interface. A machine code file 1 (or machine codes, usually numerical codes in hexadecimal) received by the computer platform 3 can be analyzed into user-friendly and easy-reading information via the computer communication interface transmission control codes analyzing system 2 of the present invention, so as to let computer engineers process the debugging work more efficiently.

The computer communication interface transmission control codes analyzing system 2 of the present invention comprises a header record area 20, a descriptor analyzing unit 22, a code definition record area 21, and a display module 23.

Figure 3:
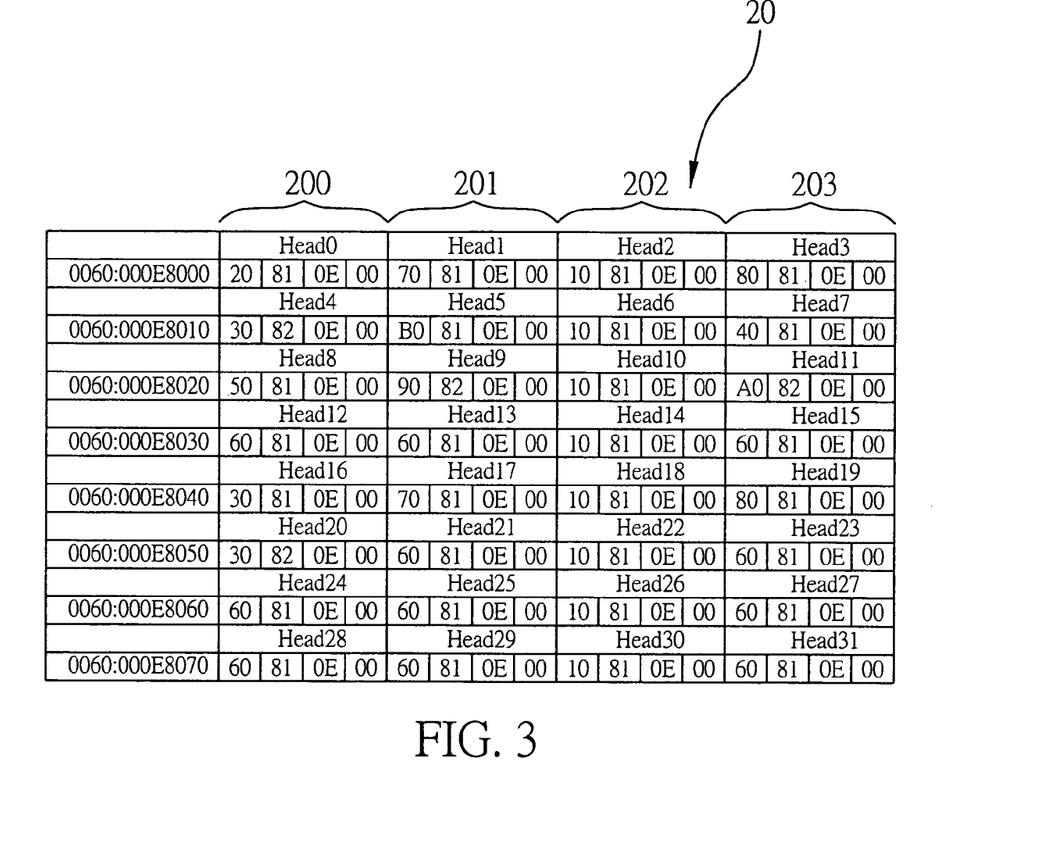
FIG. 3 is a schematic diagram showing content stored in a header record area of the computer communication interface transmission control codes analyzing system shown in FIG. 2.

The header record area 20 comprises a plurality of header units 200, 201, 202 and 203, as shown in FIG. 3, for storing address information. When transmission control codes (machine codes) generated by the electronic information device processing the data transmission with computer communication interface are read by the tracer, once an electronic information device is read, a record of data is created in specific address in the memory (not shown), and the data is then the address information to indicate the initial address stored in the memory of the transmission control codes (machine codes) generated by processing the data transmission of the electronic information device. Therefore, the header record area 20 having the header units 200, 201, 202 and 203 is created by this characteristic. According to the preferred embodiment, the header record area 20 has 32 header units, and the first header unit 200 corresponds to address information "20810E00", wherein "2081" is offset address information, "20" are less bits, "81" are greater bit, and "0E00" represents a segment address. Therefore, the first header unit 200 is actually stored in an actual address of "000E:8120". To simply and make the specification clear, the other header units' actual addresses, which can be derived similarly, are hereby omitted. From the above description, the computer communication interface transmission control codes analyzing system 2 of the present invention also needs to load the address information read by the tracer into the header record area 20 when analyzing the machine codes.

The code definition record area 21 is used to store codes generated when the electronic information device performs the data transmission process via the communication interface, and to store operating description of the codes. For example, if the machine code in hexadecimal is "40H", which represents a transfer descriptor (TD) and describes that the electronic information device outputs data (i.e., operating description content). That is, the code definition record area 21 is used to create a variety of descriptors of the transmission control codes, such as an endpoint descriptor (ED), transfer descriptor (TD) and so on, each of the created descriptors corresponding to operating description contents that are easy to be read and easy to be understood.

When receiving the transmission control codes (machine code file) read by the tracer, the descriptor analyzing unit 22 searches the machine codes for data stored in the address information in accordance with the address information stored in the header units 200, 201, 202 and 203 of the header record area 20, and searches the code definition record area 21 for codes corresponding to the data and the operating description contents represented by the codes in accordance with the searched data.

The display module 23 displays the searched codes and operating description contents on a display unit 30 of the computer platform 3 in accordance with the codes and the operating description content represented by the codes searched by the descriptor analyzing unit 22. The searched codes and operating description contents are displayed on the display unit 30 in the form of a table information 235 (shown in FIG. 5) or a graph information 235 (shown in FIG. 6). Further, the display module 23 is capable of respond to a user controlled descriptor click event, such as a user using a mouse to click a specific descriptor of the table information 230 or the graph information 235. For example, in the embodiment in FIG. 4, a user uses a mouse to click a descriptor "_command_ED" of the table information 230, the display module 23 then adopt a popup window 231 to display contents of the descriptor "_command_ED" (i.e., operating description). Then the user is allowed to check whether the content of each descriptor is correct via the popup window 231, so as to find out where the error code is. In addition, the file format of table information 230 is in a Hyper Text Markup Language (HTML) file format. Moreover, in the embodiment in FIG. 5, the display module 23 displays each descriptor corresponding to a header unit.

Figure 6:
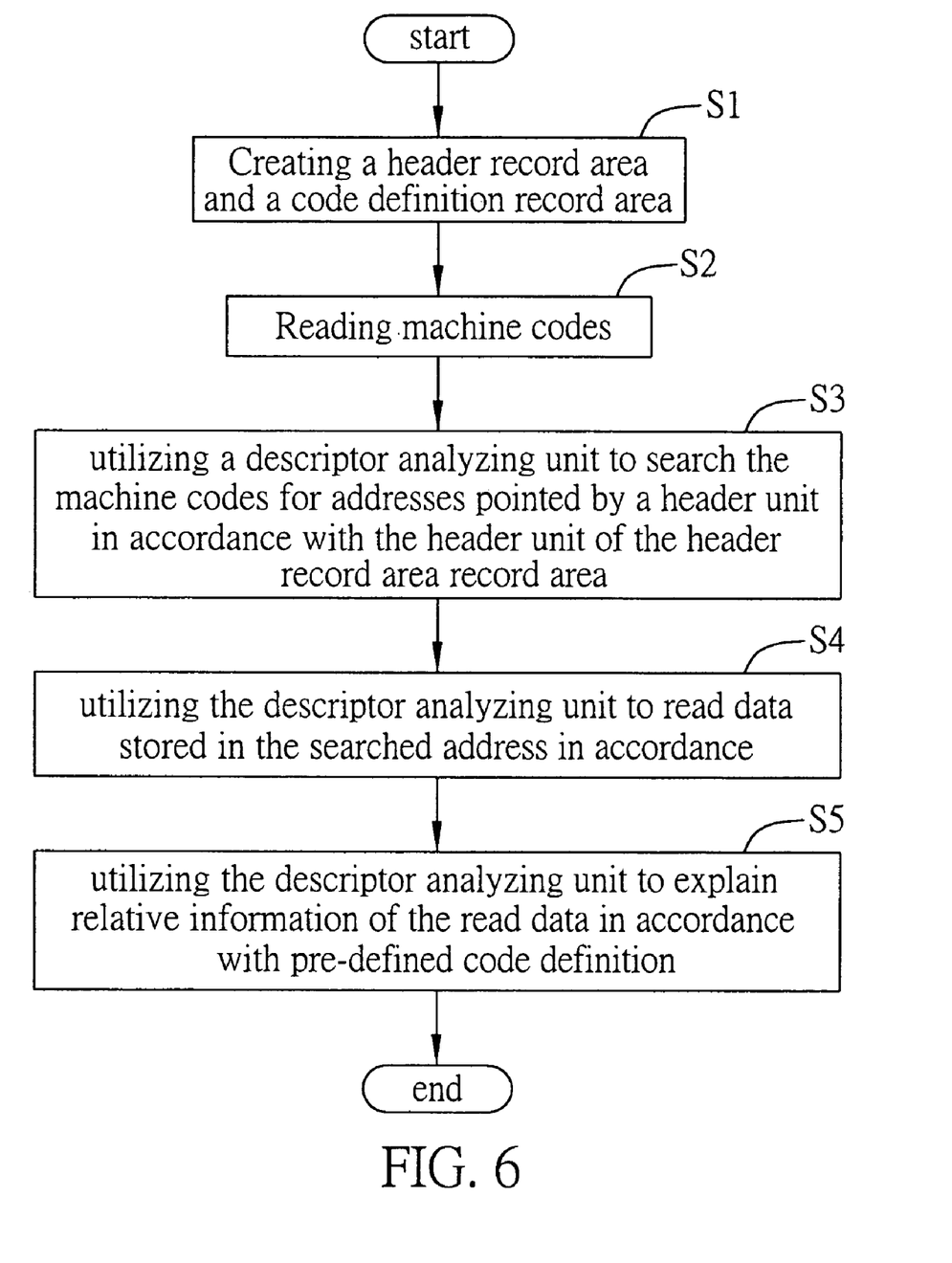
FIG. 6 is a flowchart of a computer communication interface transmission control codes analyzing method according to the present invention.

FIG. 6 is a flowchart of a computer communication interface transmission control codes analyzing method according to the present invention. The transmission control codes are generated when the electronic information device exchanges data with a computer host via a computer communication interface, and the transmission control codes can be read via a tracer (as the hexadecimal machine codes shown in FIG. 1). However, the transmission content between an electronic information device and a computer host cannot be understood by people in accordance with the transmission control codes. Therefore, through the use of the computer communication interface transmission control codes analyzing method of the present invention, users (test engineers) can easily understand the transmission control codes and complete the debugging work more efficiently. Referring to FIG. 6, in step S1 a header record area 20 and code definition record area 21 are created in a memory of a computer platform 3. The tracer creates a header unit when ascertaining an electronic information device is going to exchange data with a computer host via a computer communication interface. The header unit is the address information used to indicate the transmission control codes (machine codes) generated by processing the data transmission by the electronic information device to store into the initial address of the memory. Once the tracer obtains the header unit, the header unit is then stored into a specific memory. For example, the header unit can be directly stored into the memory of the computer platform 3 or the memory of the tracer (not shown), and stored into the header record area 20 before the computer communication interface transmission control codes analyzing method is started. Furthermore, corresponding codes are generated when the electronic information device performs the data transmission process via the communication interface. As a result, the code definition record area 21 of the computer platform 3 is used to store the codes generated when the the data transmission is performed by the electronic information device via the communication interface and to store the operating description content represented by the codes, so as to translate the machine codes to the content that is easy to understand by a user in the subsequent processes, then processing to step S2.

In step S2, the received transmission control codes (machine codes) is read. Then proceed to step S3. It should be noted that the transmission control codes (machine codes) can be read by the tracer or can be obtained via the data transferred from the debugging port (not shown) that is electrically connected to the computer platform 3.

In step S3, the descriptor analyzing unit 22 of the computer platform 3 obtains the address in accordance with the header units of the header record area 20. Then proceed to step S4.

In step S4, the descriptor analyzing unit 22 searches the machine code file for data stored in the address in accordance with the obtained address. Then proceed to step S5.

Figure 4:
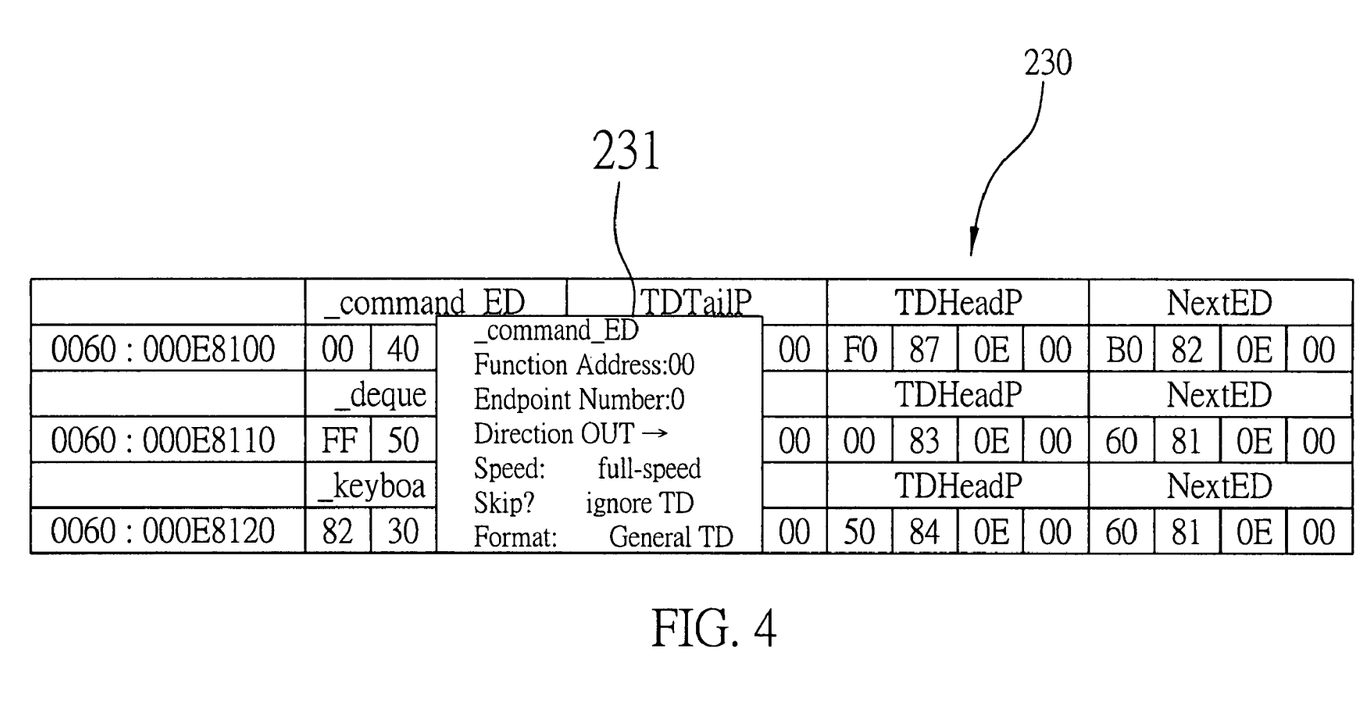
FIG. 4 is a first demonstration showing transmission control codes obtained by employing the computer communication interface transmission control codes analyzing system of the present invention after translating.
Figure 5:
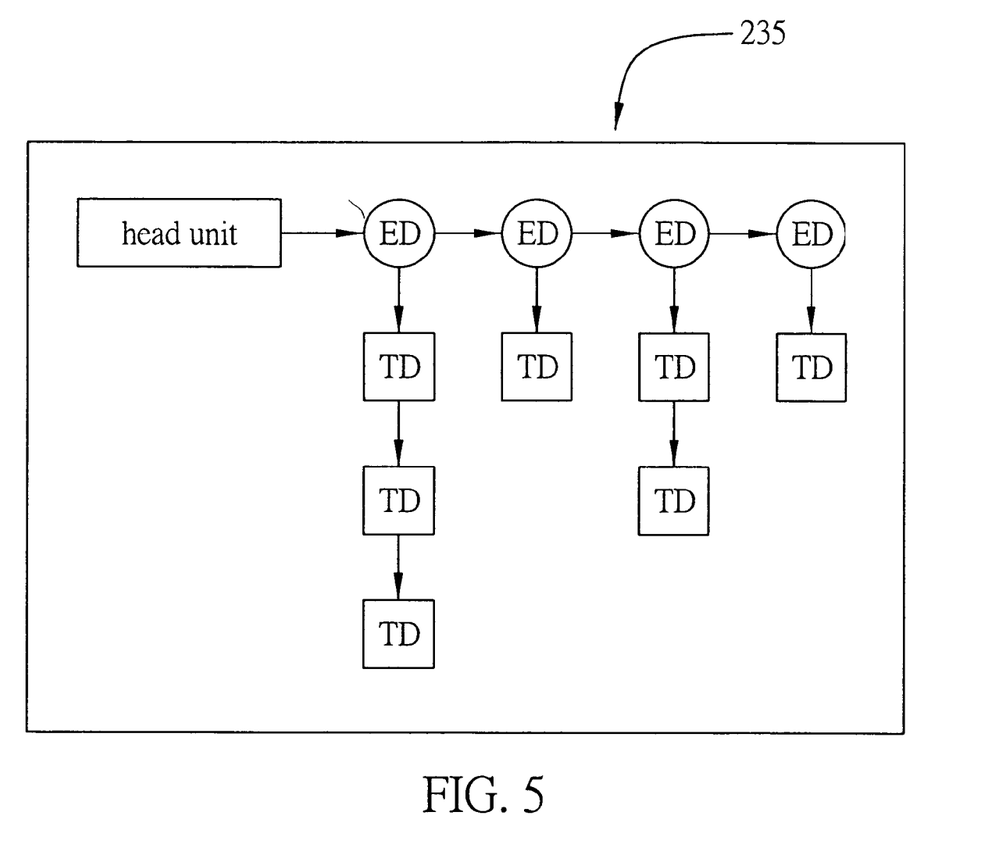
FIG. 5 is a second demonstration showing transmission control codes obtained by employing the computer communication interface transmission control codes analyzing system of the present invention after translating.

In step S5, the computer platform 3 searches the code definition record area 21 for codes corresponding to the searched data and the operating description contents represented by the codes in accordance with the searched data, and displays the searched codes and operating description contents on a display unit 30 electrically connected to the computer platform 3. In addition, translated machine codes are shown in the form of a table or a graph (as shown in FIG. 4 and 5, respectively) in accordance with the user's requirement.

In conclusion, a transmission control codes analyzing function is provided by the computer communication interface transmission control codes analyzing system 2 of the present invention, which is characterized in translating the transmission control codes transferred by the specific communication interface into the specific symbolic form that is easy to understand for humans in accordance with a pre-defined corresponding method, and the translated symbolic form is collected to a table file in specific form in accordance with a pre-defined table-based method, such as a table file in HTML format or content in graphic form, to list the content of each descriptor of transmission control codes, so as to let users understand the content of each descriptor easily and find out where the error code is easily during debugging work. Therefore, the present invention has an inventive step and practicality.

Although the foregoing embodiment was chosen and described in order to best explain the principles of the invention and its practical application, it is not intended to limit the scope of the present invention, but rather to enable others skilled in the art to best understand and utilize the invention with various modifications as are suited to the particular use contemplated. The scope of the invention is defined by the following claims and their equivalents.

What is claimed is:

1. A computer communication interface transmission control codes analyzing method for a computer platform to analyze machine codes received by the computer platform, the machine codes being transmission control codes generated by an electronic information device, transmitted over a computer communication interface and read by a data reading device, the method comprising:
    utilizing the computer platform to create a header record area having a plurality of header units for storing address information;
    utilizing the computer platform to create a code definition record area for storing codes and operating description contents represented by the codes, the codes being generated when the electronic information device generates the transmission control codes and the transmission control codes are transmitted over the communication interface;
    utilizing the computer platform to search the machine codes for data stored in the address information stored in the header units of the header record area when the computer platform receiving the machine codes; and
    utilizing the computer platform to search the code definition record area for codes corresponding to the searched data and operating description contents represented by the searched codes, and displaying the searched codes and operating description contents on a display unit electrically connected to the computer platform.

2. The method of claim 1, wherein the data reading device is a tracer.

3. The method of claim 1, wherein the communication interface is a Universal Serial Bus (USB) communication interface.

4. The method of claim 1, wherein the communication interface is a Firewire communication interface.

5. The method of claim 1, wherein the searched codes and operating description contents are displayed on the display unit in the form of a table.

6. The method of claim 5, wherein the table is in a Hyper Text Markup Language (HTML) file format.

7. The method of claim 1, wherein the searched operating description contents adopt a popup window to display a relation between the searched operating description contents and the searched codes.

8. The method of claim 1, wherein the searched codes and operating description contents are displayed in the form of a graph.

9. The method of claim 8, wherein the graph is a serial-connection graph.

10. A computer communication interface transmission control codes analyzing system for a computer platform to analyze machine codes received by the computer platform, the machine codes being transmission control codes generated by an electronic information device, transmitted over a computer communication interface and read by a data reading device, the system comprising:
   a header record area having a plurality of header units for storing address information;
   a code definition record area for storing codes generated when the electronic information device generates the transmission control codes and the transmission control codes are transmitted over the communication interface; and
   a descriptor analyzing unit for searching the machine codes for data stored in the address information of the header units of the header record area when receiving the machine codes, searching the code definition record area for codes corresponding to the searched data and operating description contents represented by the searched codes, and displaying the searched codes and operating description contents on a display unit electrically connected to the computer platform.

11. The system of claim 10, wherein the data reading device is a tracer.

12. The system of claim 10, wherein the communication interface is a Universal Serial Bus (USB) communication interface.

13. The system of claim 10, wherein the communication interface is a Firewire communication interface.

14. The method of claim 10, wherein the searched codes and operating description contents are displayed on the display unit in the form of a table.

15. The method of claim 14, wherein the table is in an HTML file format.

16. The method of claim 10, wherein the searched operating description contents adopt a popup window to display a relation between the searched operating description contents and the searched codes.

17. The method of claim 10, wherein the searched codes and operating description contents are displayed in the form of a graph.

18. The method of claim 17, wherein the graph is a serial-connection graph.

* * * * *